US005124891A

United States Patent [19]

Blusseau

[11] Patent Number: 5,124,891

[45] Date of Patent: Jun. 23, 1992

[54] MOTOR VEHICLE HEADLIGHT INCLUDING AN IMPROVED LIGHT SOURCE

[75] Inventor: Eric Blusseau, Carrieres-sur-Seine, France

[73] Assignee: Valeo Vision, Bobigny Cedex, France

[21] Appl. No.: 645,227

[22] Filed: Jan. 24, 1991

[30] Foreign Application Priority Data

Jan. 26, 1990 [FR] France ............................ 90 00920

[51] Int. Cl.[5] ............................ B60Q 1/04

[52] U.S. Cl. ............................ 362/61; 362/263; 362/303

[58] Field of Search ............................ 362/61, 80, 263, 303, 362/343

[56] References Cited

U.S. PATENT DOCUMENTS 1,300,202 4/1919 Stubblefield ............................ 362/303

FOREIGN PATENT DOCUMENTS 208574 1/1987 European Pat. Off. .
561746 7/1930 Fed. Rep. of Germany .
2033443 1/1971 Fed. Rep. of Germany .
1214367 4/1960 France .

*Primary Examiner*—Stephen F. Husar
*Attorney, Agent, or Firm*—Blakely, Sokoloff, Taylor & Zafman

[57] ABSTRACT

A motor vehicle headlight comprising: a light source; a first reflector of the ellipsoid kind having a first focus situated in the vicinity of the source; a mask passing through the second focus of the first reflector and presenting a light-passing window in the vicinity of said second focus, the shape of the window being fixed and predetermined so as to define a virtual light source whose light emission pattern corresponds essentially to said shape; and a second reflector situated on the opposite side of the mask to the first reflector and having a surface which itself determines the positions of the images of the virtual source as a function of a determined photometric distribution. The headlight is particularly suitable for use with an arc lamp that is required to co-operate with a reflector capable itself of generating a beam with a sharp cutoff.

10 Claims, 4 Drawing Sheets

MOTOR VEHICLE HEADLIGHT INCLUDING AN IMPROVED LIGHT SOURCE

The present invention relates in general to a motor vehicle headlight.

BACKGROUND OF THE INVENTION

Headlight reflectors are known in the prior art and in particular are described in the following patents FR-A-2 536 502, FR-A-2 536 503, FR-A-2 583 139, FR-A-2 597 575, FR-A-2 599 120, FR-A-2 599 121, FR-A-2 600 024, FR-A-2 602 306, FR-A-2 609 146, FR-A-2 609 148, FR-A-2 621 679, FR-A-2 634 003, all in the name of the present Applicant, and all sharing the common characteristic of the reflector itself forming filament images having positions on a projection screen which are well determined as a function of a particular desired photometric distribution, in particular relative to a cutoff that the type of beam under consideration is required to have.

It will be understood that in order to provide satisfactory results, such a reflector must co-operate with a light source whose geometry is sufficiently well determined.

When the light source is an incandescent filament, the light-emitting outline is closely correlated to the physical configuration of the filament, and said physical configuration is generally established in reproducible manner and with satisfactory accuracy from one lamp to another. Thus, FIG. 1*a* of the accompanying drawings is a series of isoluminence curves representing the light emission pattern of such a filament, which filament is generally in the form of a rectilinear cylinder.

However, certain types of lamp exist in which the light emission geometry does not have these qualities. This may arise in filament lamps where the shape or the position of the filament varies significantly from one lamp to another, e.g. for manufacturing reasons, or else where the geometrical shape of the filament is poorly defined, e.g. by being curved.

This may also occur in arc lamps which are valued because of their efficiency at generating light and which are now being developed for use in motor vehicle headlights. This type of lamp has a light emission pattern whose outline varies considerably, both from one lamp to another and within the same lamp depending on its state (while heating up or under steady conditions), and in addition the outline of the emission pattern of such a lamp is extremely diffuse which makes it very difficult to obtain a sharp cutoff using conventional means.

It will be understood that when its source is malformed in this way, a reflector of the type mentioned above will give rise to images of the source which are positioned in a more random manner, particularly relative to a cutoff. This results, in particular, in the risk of some of the images of the source spilling over significantly above the cutoff, consequently dazzling the drivers of oncoming vehicles, or else in the photometric distribution of the beam being unsatisfactory with respect to the minimum light intensities as laid down by the regulations.

In manner analogous to FIG. 1*a*, FIG. 1*b* of the accompanying drawings represents the light emission pattern of an arc established between two electrodes E1 and E2. This figure also shows a rectangle representing the "equivalent filament" occupying the ideal light-emitting zone. It can be seen that very intense light radiation is emitted by zones lying relatively far from the ideal rectangle, with such malformation giving rise to corresponding malformation of the images of the source after reflection by the reflector.

The present invention seeks to mitigate these drawbacks of the prior art and to provide a headlight capable of using a source whose geometry may be ill-defined in conjunction with a reflector of the type defined above but without the quality of the resulting light beam being significantly degraded.

SUMMARY OF THE INVENTION

To this end, the present invention provides a motor vehicle headlight comprising:

a light source;

a first reflector of the ellipsoid kind having a first focus situated in the vicinity of the source;

a mask passing through the second focus of the first reflector and presenting a light-passing window in the vicinity of said second focus, the shape of the window being fixed and predetermined so as to define a virtual light source whose light emission pattern corresponds essentially to said shape; and a second reflector situated on the opposite side of the mask to the first reflector and having a surface which itself determines the positions of the images of the virtual source as a function of a determined photometric distribution.

The light source may be the arc of a discharge lamp, for example.

Preferably, the first reflector is a portion of an ellipsoid whose first focus is situated substantially at the center of the light source, and whose second focus is situated substantially at the center of the window.

Advantageously, the mask is situated in a vertical plane including an optical axis of the second reflector.

It is particularly preferable for the window to be rectangular in shape, with its long sides being horizontal.

In a variant, the window is in the form of a notch extending vertically upwards from a horizontal bottom.

The straight line passing through the first and second focuses of the first reflector is either substantially perpendicular to the optical axis of the second reflector, or else is inclined relative to the optical axis of the second reflector by an angle which is substantially less than 90°.

In a particular embodiment, the second reflector has an optical axis which lies in the plane of the mask and which runs along a rectilinear bottom edge of the window, and has a reference focus situated at a determined position along said axis, the reflector comprising a reflecting surface which generates images of the virtual source such that the topmost points of the images are situated in the close vicinity of a cutoff.

BRIEF DESCRIPTION OF THE DRAWINGS

Embodiments of the invention are described by way of example with reference to the accompanying drawings, in which.

DETAILED DESCRIPTION

Figure 1A:
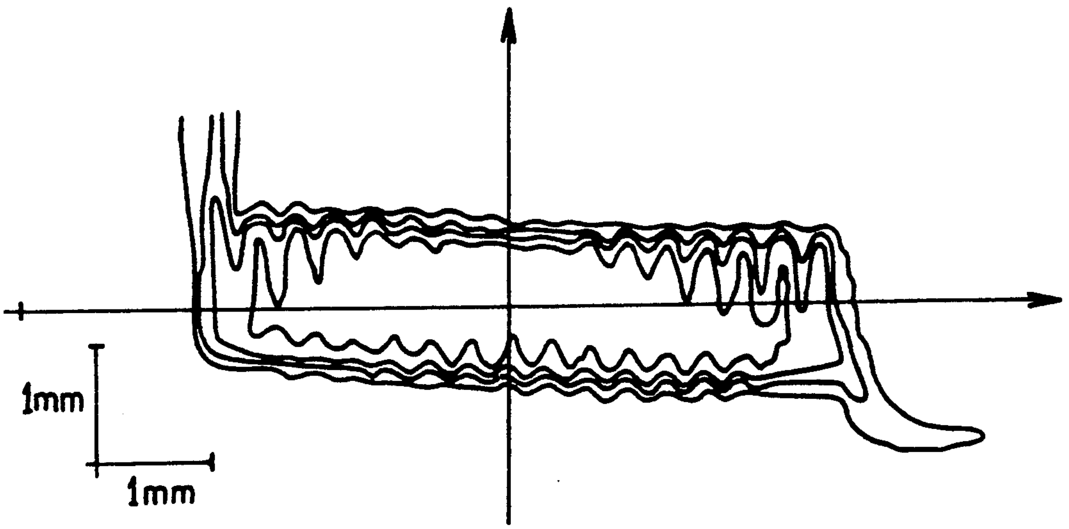
FIGS. 1*a* and 1*b* are isoluminance diagrams described above.
Figure 1B:
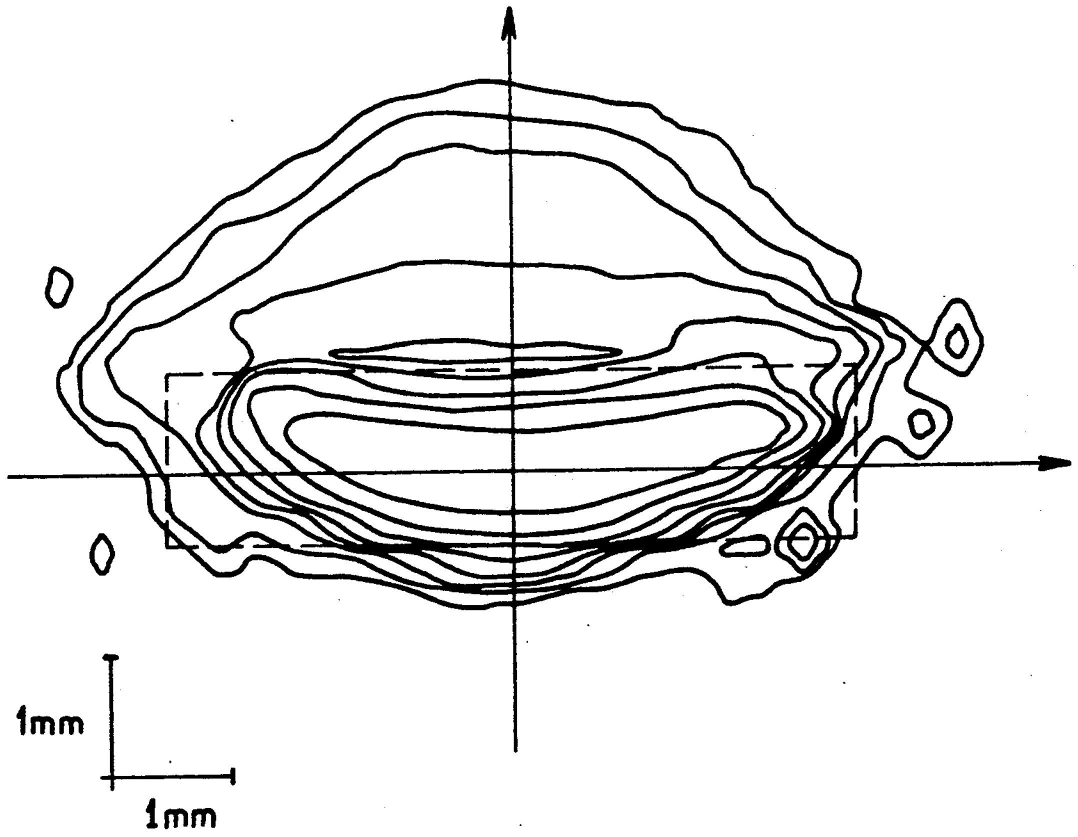

It is specified initially that items or portions that are identical or similar from one figure to another are designated therein by the same reference numerals.

Figure 2:
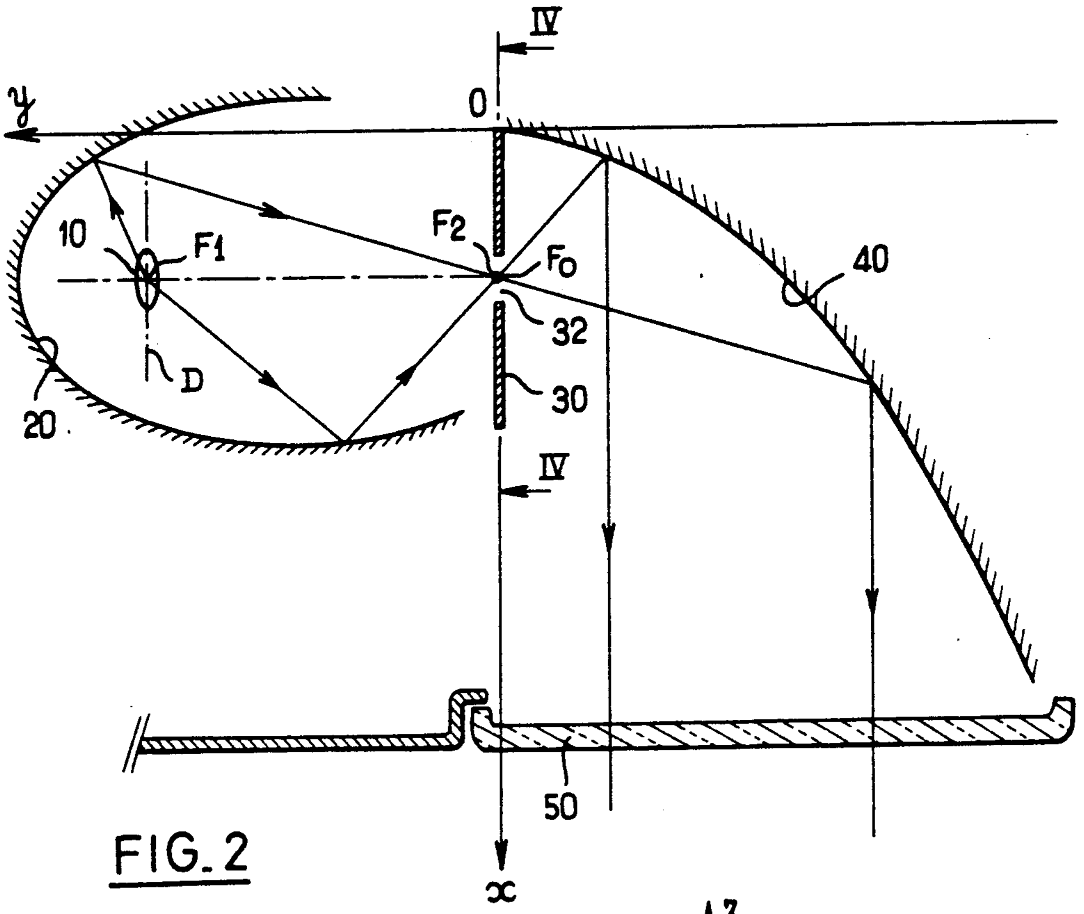
FIG. 2 is a horizontal section through a headlight of the present invention.

With reference initially to FIG. 2, a motor vehicle headlight of the present invention essentially comprises an elongate light source represented diagrammatically at 10. It may be constituted, for example, by an incandescent filament having ill-defined outlines as mentioned above, or else it may be constituted by an arc generated within a discharge lamp.

The headlight also comprises a first reflector 20 which is generally ellipsoidal in shape and which is characterized by its two focuses F1 and F2. The first focus F1 is situated approximately at the center of the source 10.

In the present example, the long axis of the ellipsoid extends substantially horizontally and perpendicularly to the general emission direction Ox of the headlight. Further, although FIG. 2 shows the long axis of the ellipse to be perpendicular to the longitudinal direction D of the source, this disposition is entirely optional and in a variant the source could be aligned along said long axis or could take up any other orientation.

Figure 3:
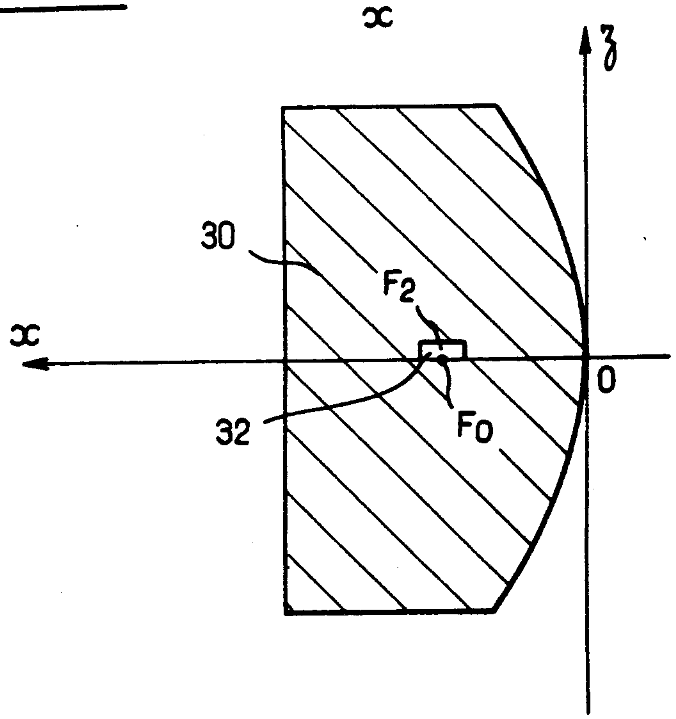
FIG. 3 is an elevation view of a portion of the FIG. 2 headlight.

A mask 30 occupying a plane perpendicular to the long axis of the ellipsoid and passing through or close to its second focus F2 is interposed on the path of the light rays reflected by the first reflector 20. This mask includes a window 32 which can be seen more clearly in FIG. 3. The window is generally rectangular in shape, with its long sides extending horizontally and its short sides vertically. It is positioned in such a manner that the focus F2 lies substantially at the center of the rectangle, as shown.

The headlight also comprises a second reflector 40 which is referenced to an optical axis Ox extending horizontally in the present example in the plane of the mask 30 and running along the bottom long edge of the window 32.

This reflector 40 is intended to form the light beam of the headlight from the radiation that comes through the window 32. It is therefore itself capable of forming a beam of given photometric distribution, optionally having a determined and well-defined cutoff. It may be constituted, for example, by one-half of a reflector as described in French patent application No. 2 597 575, the content of which is incorporated into the present description by reference, and to which reference may be made for further details. It is merely recalled that such a reflector is capable of forming images of the light source with which it co-operates, which images are essentially all situated beneath a standardized European cutoff, with the top points of the images lying in the vicinity of said cutoff. It should also be observed that although only half of a reflector is used, the entire beam is nevertheless defined.

In practice, regardless of which beam-generating reflector is used, care is taken to position this reflector relative to the other components of the headlight in such a manner that the rectangular window 32 in the mask 30 occupies as accurately as possible the position that would normally be occupied by a filament enabling this reflector to form the desired beam. Thus, in the specific example mentioned above, the position of the rectangle immediately above the optical axis Ox is such that its center is immediately over the reference focus F0 of the surface of the reflector, thereby corresponding to the position of the elongate filament described in the above-mentioned French patent application.

It should be observed that the window 32 may be similar in size to a standardized filament, or it may be different in size. In particular, a greater quantity of light flux is recovered using a window which is larger in size. Under such circumstances, care is taken to adjust the parameters governing the surface equation of the second reflector 40 so as to obtain the required beam.

In order to avoid forming interfering reflections of one side or the other of the mask 30, and thus degrading the beam, both faces of the mask are preferably nonreflecting. For example they may be covered with a matt black coating.

Finally, the headlight includes a closure glass 50 which, in conventional manner, may include light-deflecting prisms or stripes suitable for spreading the beam, without spoiling the cutoff as defined by the reflector.

Thus, in accordance with an essential aspect of the present invention, the real light source 10 having an outline which is geometrically ill-defined is used in conjunction with a first reflector 20 and a mask 30 to form a virtual light source having an extremely well-defined outline at the focus F2 in a position which is well-determined relative to the reference focus(es) of the second reflector 40. As a result, the images of this source as formed by the second reflector 40 are extremely clean, thereby giving rise to a beam which has the desired characteristics under all circumstances. The present invention is thus insensitive to variations in the light emission pattern of the real source 10, regardless of whether such variation is due to the lamp being replaced or to the lamp warming up. Further, by using an ellipsoidal type of first reflector, the invention provides excellent recovery of the light flux emitted by the source.

As mentioned above, the present invention can be used with second reflectors of arbitrary type. For example, any of the reflectors described in the Applicant's French patent applications mentioned in the introduction may be used. The respective contents of these patents are included for this purpose in the present description by reference.

Naturally, in order to achieve the above results, the reflector 20, the real source 10, and the mask 30 must be designed and dimensioned in such a manner that at least some of the images of the source 10 as created by the reflector 20 in the vicinity of the mask 30 are larger than the window 32, i.e. for this type of image the window must lie entirely within or practically entirely within the outline of the images.

Figure 4:
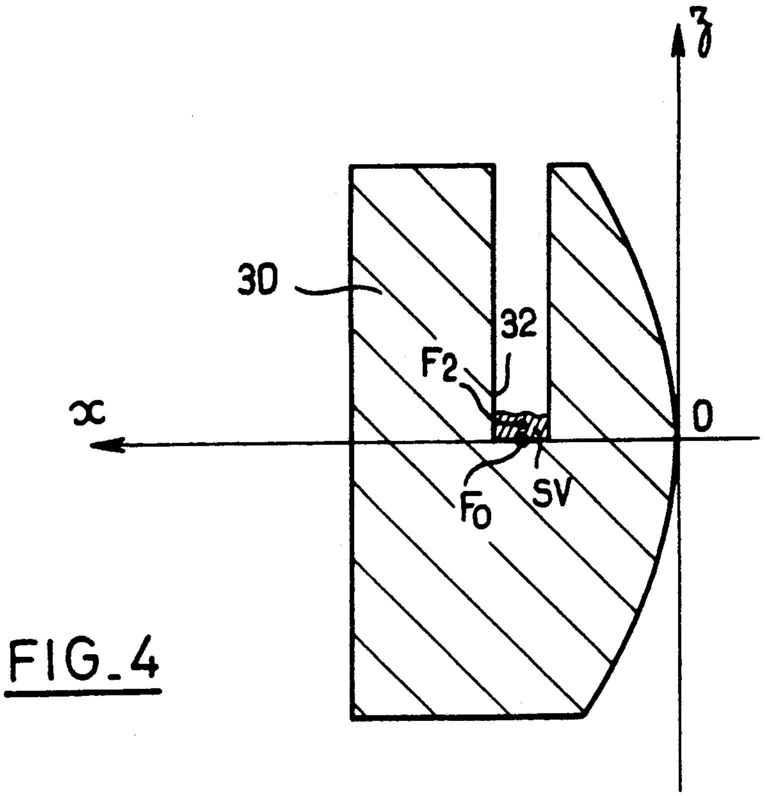
FIG. 4 is an elevation view of a variant of the portion shown in FIG. 3.

FIG. 4 shows a first variant embodiment of the invention. In order to recover as large as possible a portion of the light flux received in the vicinity of the window 32 in the mask 30, the window is now in the form of a notch whose bottom occupies the position that was occupied by the bottom long side of the rectangle in FIG. 3, and whose two vertical sides are constituted by upward extensions of the two small sides of the rectangle. In this case, the virtual source, reference SV in FIG. 4, has an outline with bottom and end edges that are accurately defined by the sides of the notch, and a top edge that may be variable and depends on the pattern of light emission from the real source 10, and also to some extent on the design of the first reflector 20.

Figure 5:
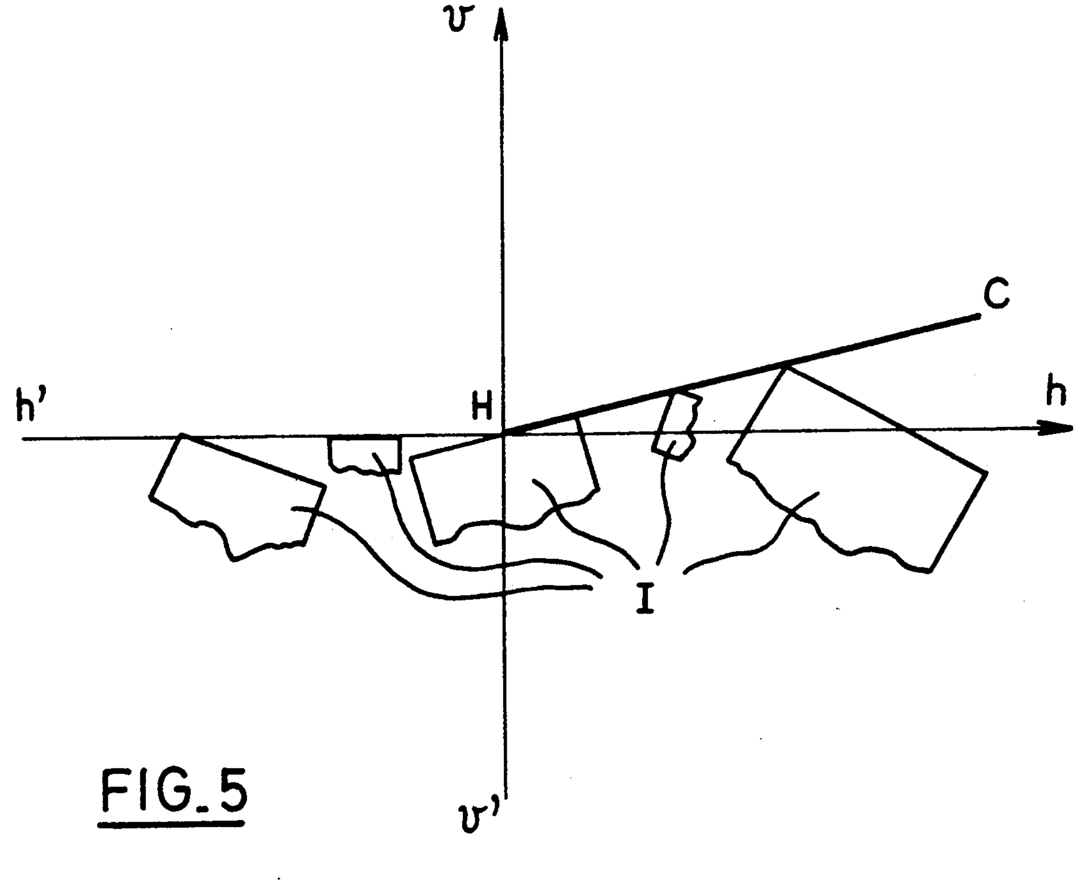
FIG. 5 shows the images of the source as projected by the variant of FIG. 4.

FIG. 5 represents a standardized projection plane on which the standardized European cutoff h'HC is drawn, together with a few images I of this virtual source as formed by the second reflector as mentioned above.

It can be seen that the rotation imparted to the images by the reflector is such that the ill-defined edge of the virtual source is always to be found at a distance from the cutoff. There is therefore no risk of distrubing cutoff formation. More precisely, the cutoff is generated solely by the three well-defined edges of the virtual source and of its images, and as a result the cutoff remains extremely sharp.

This variant thus enables the light intensity of the resulting beam to be increased without in any way compromising the photometric distribution characteristics of the cutoff.

Figure 6:
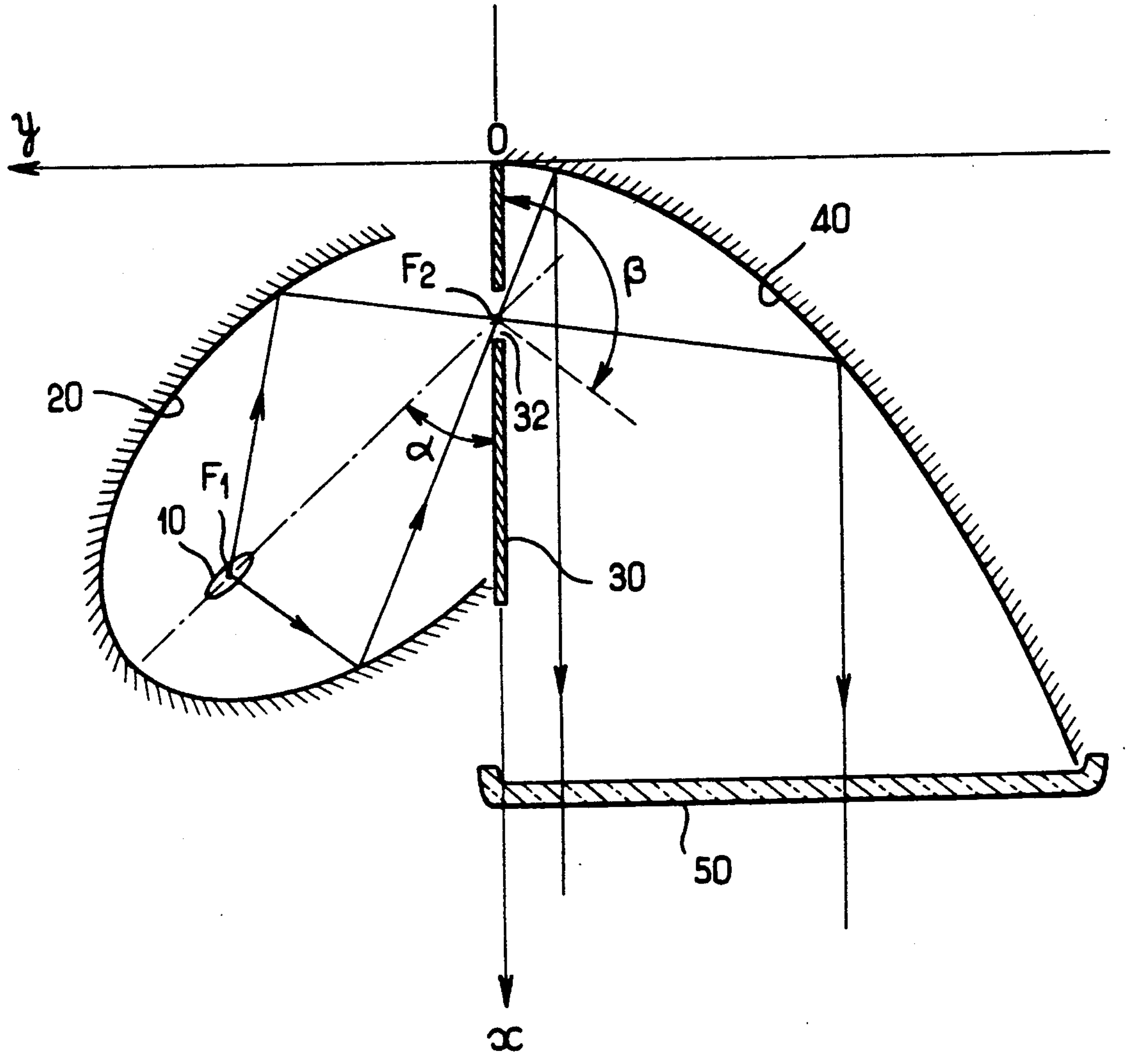
FIG. 6 is a horizontal section through a variant embodiment of a headlight of the invention.

FIG. 6 shows a variant of the FIG. 2 headlight. This variant differs from the basic embodiment mainly in that the long axis of the ellipsoid defined by the first reflector 20 although still lying in a horizontal plane is now inclined relative to the optical axis Ox of the second reflector 40 at an angle $\alpha$ which is substantially less than 90°, and in the example shown is about 45°. In this example, the real source 10 is shown disposed in alignment with the long axis of the ellipsoid.

It should be observed that the mask 30 and its window 32 can continue to have the same shape as that described above.

In some cases, this variant makes it possible to recover the light flux emitted by the real source 10 more easily. More precisely, the entire solid angle $\beta$ occupied by the second reflector 40 as seen through the window 32 can now be covered without the first reflector projecting behind the headlight as it does in FIG. 2. Such rearwards projection may be objectionable. More precisely, in the present case both reflectors can be contained without difficulty inside the outline of a conventionally-designed headlight, and this is advantageous for purposes of compactness.

In addition, the orientation of the long axis of the ellipse may be selected in such a manner that the angular extent required of the first reflector is covered by a first reflector which is symmetrical about its long axis, and which is therefore easier to manufacture. In particular, it turns out to be particularly preferable to use one half of an ellipsoid as delimited by a plane of symmetry extending perpendicularly to its long axis.

Naturally the present invention is not limited to the embodiment described above and shown in the drawings, and the person skilled in the art will be able to make variants and modifications within the scope of the invention.

In particular, although the long axis of the ellipsoid is described above as lying in a horizontal plane, this should not be considered as being limiting.

I claim:

1. A motor vehicle headlight comprising:
a light source;
a first reflector of the ellipsoid kind having a first focus situated in the vicinity of the source;
a mask passing through the second focus of the first reflector and presenting a light-passing window in the vicinity of said second focus, the shape of the window being fixed and predetermined so as to define a virtual light source whose light emission pattern corresponds essentially to said shape; and
a second reflector situated on the opposite side of the mask to the first reflector and having a surface which itself determines the positions of the images of the virtual source as a function of a determined photometric distribution.

2. A headlight according to claim 1, wherein the light source is the arc of a discharge lamp.

3. A headlight according to claim 1, wherein the first reflector is a portion of an ellipsoid whose first focus is situated substantially at the center of the light source, and whose second focus is situated substantially at the center of the window.

4. A headlight according to claim 1, wherein the mask is situated in a vertical plane.

5. A headlight according to claim 4, wherein the mask is situated in a plane including the optical axis of the second reflector.

6. A headlight according to claim 1, wherein the window is rectangular in shape, with its long sides being horizontal.

7. A headlight according to claim 1, wherein the window is in the form of a notch extending vertically upwards from a horizontal bottom.

8. A headlight according to claim 1, wherein the straight line passing through the first and second focuses of the first reflector is substantially perpendicular to an optical axis of the second reflector.

9. A headlight according to claim 1, wherein the straight line passing through the first and second focuses of the first reflector is inclined relative to an optical axis of the second reflector by an angle which is substantially less than 90°.

10. A headlight according to claim 1, wherein the second reflector has an optical axis which lies in the plane of the mask and which runs along a rectilinear bottom edge of the window, and has a reference focus situated at a determined position along said axis, the reflector comprising a reflecting surface which generates images of the virtual source such that the topmost points of the images are situated in the close vicinity of a cutoff.

* * * * *